US012590878B2

(12) United States Patent
Gordon

(10) Patent No.: US 12,590,878 B2
(45) Date of Patent: Mar. 31, 2026

(54) SYSTEMS AND METHODS FOR DETECTING FOREIGN METALLIC PARTICLES

(71) Applicant: Toyota Research Institute, Inc., Los Altos, CA (US)

(72) Inventor: Matthew P. Gordon, Berkeley, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 288 days.

(21) Appl. No.: 18/475,501

(22) Filed: Sep. 27, 2023

(65) Prior Publication Data

US 2024/0288353 A1     Aug. 29, 2024

Related U.S. Application Data

(63) Continuation-in-part of application No. 18/115,395, filed on Feb. 28, 2023.

(51) Int. Cl.
H01M 4/1395 (2010.01)
G01N 15/0205 (2024.01)
(Continued)

(52) U.S. Cl.
CPC ......... G01N 15/0205 (2013.01); G01N 21/94 (2013.01); G01N 21/95 (2013.01);
(Continued)

(58) Field of Classification Search
CPC ....... G01N 15/0205; G01N 2015/0061; G01N 21/94; G01N 21/945; G01N 21/95;
(Continued)

(56) References Cited

U.S. PATENT DOCUMENTS 7,233,841 B2    6/2007  Sadighi et al.
9,126,204 B1 *  9/2015  Toberman ................. C10L 5/08
(Continued)

FOREIGN PATENT DOCUMENTS

JP        2015185278 A      10/2015

OTHER PUBLICATIONS

Frommknecht et al. "Automated inline visual inspection and 3D measuring in electrode manufacturing", Jun. 21, 2019, 12 pages Available at https://acrobat.adobe.com/link/review?uri=urn:aaid:scds:US:08dc9036-c06f-3117-86e7-432fcaad0665.
(Continued)

*Primary Examiner* — Kara E. Geisel
*Assistant Examiner* — Jonathon Cook
(74) *Attorney, Agent, or Firm* — Christopher G. Darrow; Darrow Mustafa PC

(57) ABSTRACT

One form of a metallic particle detection system detects automatically, through analysis of image data from a first sensor, a foreign metallic particle in or on an active material layer of an electrode strip moving between a section and a subsequent section on a roll-to-roll coated electrode manufacturing line that manufactures a plate electrode. The system also determines a position of the foreign metallic particle on the electrode strip moving on the roll-to-roll coated electrode manufacturing line. The system also triggers, in response to detection of the foreign metallic particle and based on the position of the foreign metallic particle and a speed at which the electrode strip is moving, the second sensor, the second sensor generating a reflectance spectrum of the foreign metallic particle. The system also analyzes the reflectance spectrum to identify a type of metal of which the foreign metallic particle is composed.

17 Claims, 9 Drawing Sheets

(51) Int. Cl.

| | |
|---|---|
| *G01N 21/88* | (2006.01) |
| *G01N 21/89* | (2006.01) |
| *G01N 21/94* | (2006.01) |
| *G01N 21/95* | (2006.01) |
| *G01N 15/00* | (2006.01) |

(52) U.S. Cl.
CPC .. *H01M 4/1395* (2013.01); *G01N 2015/0061* (2013.01); *G01N 2021/8861* (2013.01); *G01N 2021/8909* (2013.01)

(58) Field of Classification Search
CPC .............. G01N 21/88; G01N 21/8803; G01N 21/8851; G01N 21/89; G01N 21/8901; G01N 2021/8845; G01N 2021/889; G01N 2021/8893; G01N 2021/8909; G01N 2021/945; G01N 2021/8861; H01M 4/1395
See application file for complete search history.

(56) References Cited

U.S. PATENT DOCUMENTS

| | | | | |
|---|---|---|---|---|
| 10,128,547 | B2 | 11/2018 | Fujimaki et al. | |
| 2010/0074405 | A1* | 3/2010 | Saito ................... | G01N 23/223 |
| | | | | 356/237.1 |
| 2013/0320216 | A1* | 12/2013 | Aiko ...................... | G01N 21/88 |
| | | | | 250/353 |
| 2017/0119130 | A1* | 5/2017 | Witchell ................ | G01N 21/31 |
| 2023/0349834 | A1* | 11/2023 | Choi ................... | G01N 21/8851 |

OTHER PUBLICATIONS

Mabe et al. "Photonic Low Cost Micro-Sensor for in-Line Wear Particle Detection in Flowing Lube Oils", Mar. 14, 2017, 28 pages Available at https://acrobat.adobe.com/link/review?uri=urn:aaid:scds:US:5ab1ccd3-54a3-3358-be59-7edf385f3ee5.

Kapeller et al. "Photometric stereo-based high-speed inline battery electrode inspection", Jun. 2021, 10 pages Available at https://acrobat.adobe.com/link/track?uri=urn:aaid:scds:US:c3a5a899-4639-3356-9cc0-2626a1daae81.

Just et al., "Infrared particle detection for battery electrode foils," Infrared Phys Techn 61, 2013, pp. 254-258 Available at https://acrobat.adobe.com/link/review?uri=urn:aaid:scds:US:1e8e526b-e77e-3d5b-8891-b564c37cebd8.

Kurfer et al. "Production of large-area lithium-ion cells—Preconditioning, cell stacking and quality assurance." CIRP annals 61.1 (2012): 1-4. Available at https://acrobat.adobe.com/link/review?uri=urn:aaid:scds:US:41dbbc75-d5b5-383c-a831-5a09c72fd5eb.

Meyer et al. "Operando Optical Spectroscopy Studies of Batteries." Journal of the Electrochemical Society 168.9 (2021): 090561 Available at https://acrobat.adobe.com/link/review?uri=urn:aaid:scds:US:b3dd1cd5-e0b9-377e-a8e6-939bb293747.

Pan et al. "Detecting the foreign matter defect in lithium-ion batteries based on battery pilot manufacturing line data analyses." Energy 262 (2023): 125502. Available at https://acrobat.adobe.com/link/review?uri=urn:aaid:scds:US:1a7439fb-e790-3645-9a2f-3710dff503df.

Shinohara et al. "Inspection and Analysis Solution for Quality Management of Lithium-ion Rechargeable Batteries." Available at https://acrobat.adobe.com/link/review?uri=urn:aaid:scds:US:b31391da-8b2b-326d-b863-9c12b3a487e0.

Zhang et al. "Machine learning-facilitated multiscale imaging for energy materials." Cell Reports Physical Science 3.9 (2022). Available at https://acrobat.adobe.com/link/review?uri=urn:aaid:scds:US:a309a547-24e4-360b-8072-f43c3d748b70.

Wang et al. "Single-shot on-chip spectral sensors based on photonic crystal slabs." Nature communications 10.1 (2019): 1020. Available at https://acrobat.adobe.com/link/track?uri=urn:aaid:scds:US:04ddd08a-301d-3618-ad93-8bcf681f6d91.

Badmos et al. "Image-based defect detection in lithium-ion battery electrode using convolutional neural networks." Journal of Intelligent Manufacturing 31 (2020): 885-897. Available at https://acrobat.adobe.com/link/track?uri=urn:aaid:scds:US:e2a57373-8cab-309b-97d5-e5718151cc1b.

Jiang et al. "Machine-learning-revealed statistics of the particle-carbon/binder detachment in lithium-ion battery cathodes." Nature communications 11.1 (2020): 2310. Available at https://acrobat.adobe.com/link/track?uri=urn:aaid:scds:US:abd118b2-fb99-380d-8010-07c16adc831d.

Qian et al. "The role of structural defects in commercial lithium-ion batteries." Cell Reports Physical Science 2.9 (2021). Available at https://acrobat.adobe.com/link/review?uri=urn:aaid:scds:US:1e3d9cce-1c63-39bc-8e41-f2bc8ca34f19.

* cited by examiner

Direction of Electrode Motion

Time (Direction of Sequential Row Exposure)

Electrode Moving at 2 m/sec

SYSTEMS AND METHODS FOR DETECTING FOREIGN METALLIC PARTICLES

CROSS-REFERENCE TO RELATED APPLICATION

This application is a continuation-in-part of co-pending U.S. patent application Ser. No. 18/115,395, "Foreign Metallic Particle Detector Systems and Methods of Detecting Foreign Metallic Particles," filed on Feb. 28, 2023, which is incorporated by reference herein in its entirety and for all purposes.

TECHNICAL FIELD

The present disclosure generally relates to metallic particle detection and, more specifically, to systems and methods for foreign metallic particle detection during roll-to-roll coated electrode manufacturing.

BACKGROUND

Typical lithium-ion battery production lines include calendaring active material onto a strip of metal foil to form anode and cathode electrode strips that may or may not be wound into coils for storage and transport. Also, an electrode strip is fed into a stacking or winding machine that cuts plate electrodes from the electrode strip and inserts separator layers between the plate electrodes such that battery cells can be assembled and inserted into battery containers which are eventually sealed.

The manufacture of plate electrodes and lithium-ion batteries in this manner is an energy and time efficient process compared to batch processes. However, such electrode manufacturing processes can result in foreign metallic particle contamination of the active material and thus the battery cells. That is, foreign (i.e., unwanted) metallic particles resulting from metal cutting, welding, and/or friction between machine parts can be present on and/or in an active material layer of a plate electrode and the foreign metallic particles can reduce the performance and operation of a battery cell.

The present disclosure addresses the issue of foreign metallic particle contamination in battery cells, and other issues related to foreign metallic particle contamination.

SUMMARY

One form of the present disclosure is a system for detecting foreign metallic particles, the system comprising a first sensor, a second sensor, a processor, and a memory storing machine-readable instructions that, when executed by the processor, cause the processor to detect automatically, through analysis of image data from the first sensor, a foreign metallic particle in or on an active material layer of an electrode strip moving between a section and a subsequent section on a roll-to-roll coated electrode manufacturing line that manufactures a plate electrode. The memory also stores machine-readable instructions that, when executed by the processor, cause the processor to determine a position of the foreign metallic particle on the electrode strip moving on the roll-to-roll coated electrode manufacturing line. The memory also stores machine-readable instructions that, when executed by the processor, cause the processor to trigger, in response to detection of the foreign metallic particle and based on the position of the foreign metallic particle and a speed at which the electrode strip is moving, the second sensor, the second sensor generating a reflectance spectrum of the foreign metallic particle. The memory also stores machine-readable instructions that, when executed by the processor, cause the processor to analyze the reflectance spectrum to identify a type of metal of which the foreign metallic particle is composed.

Another form of the present disclosure is a non-transitory computer-readable medium for detecting foreign metallic particles and storing instructions that, when executed by a processor, cause the processor to detect automatically, through analysis of image data from a first sensor, a foreign metallic particle in or on an active material layer of an electrode strip moving between a section and a subsequent section on a roll-to-roll coated electrode manufacturing line that manufactures a plate electrode. The instructions also cause the processor to determine a position of the foreign metallic particle on the electrode strip moving on the roll-to-roll coated electrode manufacturing line. The instructions also cause the processor to trigger, in response to detection of the foreign metallic particle and based on the position of the foreign metallic particle and a speed at which the electrode strip is moving, a second sensor that generates a reflectance spectrum of the foreign metallic particle. The instructions also cause the processor to analyze the reflectance spectrum to identify a type of metal of which the foreign metallic particle is composed.

Yet another form of the present disclosure is a method of detecting foreign metallic particles, the method comprising detecting automatically, through analysis of image data from a first sensor, a foreign metallic particle in or on an active material layer of an electrode strip moving between a section and a subsequent section on a roll-to-roll coated electrode manufacturing line that manufactures a plate electrode. The method also includes determining a position of the foreign metallic particle on the electrode strip moving on the roll-to-roll coated electrode manufacturing line. The method also includes triggering, in response to detection of the foreign metallic particle and based on the position of the foreign metallic particle and a speed at which the electrode strip is moving, a second sensor that generates a reflectance spectrum of the foreign metallic particle. The method also includes analyzing the reflectance spectrum to identify a type of metal of which the foreign metallic particle is composed.

These and other variations will become apparent from the following detailed description, when read in conjunction with the figures and examples, which are illustrative, not limiting.

BRIEF DESCRIPTION OF THE DRAWINGS

The accompanying drawings, which are incorporated in and constitute a part of the specification, illustrate various systems, methods, and other variations of the disclosure. It will be appreciated that the illustrated element boundaries (e.g., boxes, groups of boxes, or other shapes) in the figures represent one variation of the boundaries. In some variations, one element may be designed as multiple elements or multiple elements may be designed as one element. In some variations, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more variations may be advantageously adapted for utilization in other variations described herein.

DETAILED DESCRIPTION

The present disclosure provides a metallic particle detection system for detecting foreign metallic particles (e.g., particles of silver, aluminum, gold, copper, and/or steel, among others) on or at least partially in an active material layer of a plate electrode. The metallic particle detection system provides real-time (i.e., in-situ) detection of foreign metallic particles with average diameters less than about 1000 μm during continuous production of an electrode strip such that contaminated portions of the electrode strip can be identified and removed before such portions are assembled into a battery cell unit or a fuel cell unit. The metallic particle detection system can be used during and/or after a startup period of a new and/or existing plate electrode production line such that enhanced (e.g., faster or quicker) identification of a source or sources of foreign metallic particles is provided. For example, one or more metallic particle detection systems can be positioned at different points or locations along a plate electrode production line and used to assist operators in successively narrowing down a likely source of metallic particle contamination by observing which processes or manufacturing steps along the plate electrode production line introduce foreign metallic particles.

In the alternative, or in addition to, portions of an electrode strip contaminated with one or more foreign metallic particles can be identified and removed before such portions are assembled into a battery cell unit or a fuel cell unit. For example, in some variations an integrated wireless (e.g., Wi-Fi) or wired network transmits timestamps of detected foreign metallic particles to a controller (e.g., a manufacturing execution system (MES)), which in turn transmits a removal signal to a programmable logic controller (PLC) that is triggered to automatically remove a contaminated plate electrode and/or a contaminated battery cell or fuel cell from a production line. Accordingly, the metallic particle detection system according to the teachings of the present disclosure provides for reduction in downstream labor, materials, and time.

Figure 1:
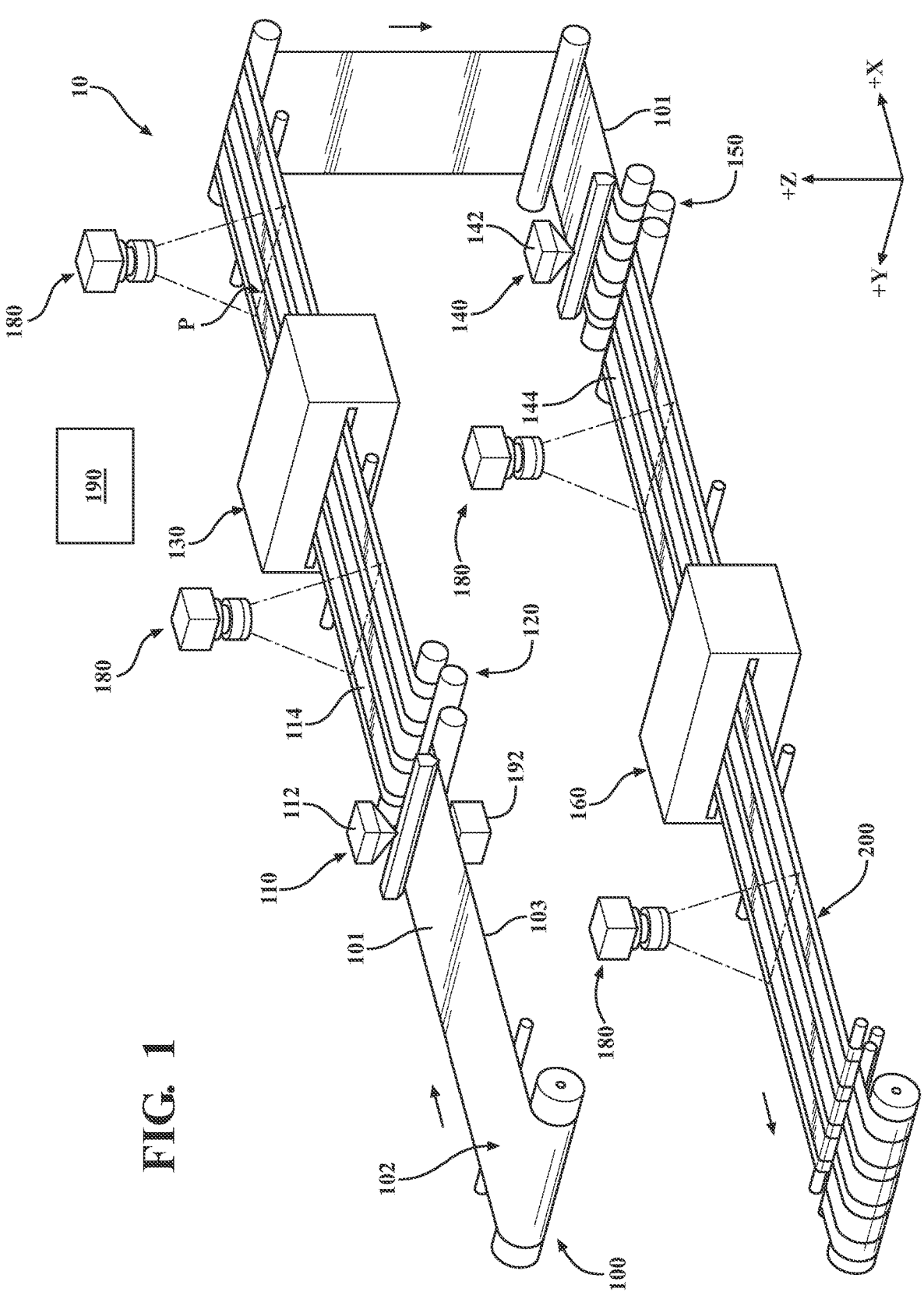
FIG. 1 illustrates a perspective view of an electrode strip production line according to the teachings of the present disclosure.

Referring now to FIG. 1, a perspective view of a plate electrode production line 10 (hereafter also referred to simply as "electrode production line 10") for manufacturing an electrode strip 200 according to the teachings of the present disclosure is shown. The electrode production line 10 includes a source 100 (e.g., a roll) of a charge collector backing layer 102 and an active material source 110 (e.g., a "first active material source 110") that provides an active material 112 (e.g., a "first active material 112") onto a first side 101 of the charge collector backing layer 102. In some variations, another active material source 140 (e.g., a "second active material source 140") that provides another active material 142 (e.g., a "second active material 142") onto a second side 103 of the electrode backing layer 102 is included. Non-limiting examples of the charge collector backing layer include foil or sheet of copper, aluminum, and alloys thereof.

A set of calendaring rollers 120 and optionally a dryer 130 are included downstream from the first active material source 110, and another set of calendaring rollers 150 and optionally another dryer 160 can be included downstream from the second active material source 142. It should be understood that FIG. 1 represents but one illustrative example of an electrode production line and that additional calendaring rollers, guide rollers, materials sources, and dryers, among other components, can be included in an electrode production line that falls within the scope of the present disclosure.

In some variations, the first active material 112 is the same as the second active material 142 (i.e., has the same chemical composition, particle size(s), etc.), while in other variations the first active material 112 is not the same as the second active material 142. Also, in at least one variation the electrode production line 10 is a wet electrode production line such that the first dryer 130 and/or the second dryer 160 are included, while in at least one other variation, the electrode production line 10 is a dry electrode production line such that a free standing electrode film is calendared onto the charge collector backing layer 102 and the first dryer 130 and/or the second dryer 160 are not included. It should be understood that the first active material source 110 is configured to provide or deposit the first active material 112 onto the first side 101 of the charge collector backing layer 102 and form one or more first active material layers 114 thereon and the second active material source 140 is configured to provide or deposit the second active material 142 onto the second side 103 of the charge collector backing layer 102 and form one or more second active material layers 144 thereon. And non-limiting examples of the first active material 112 and/or the second active material 142 include materials containing carbon such that the color of the active material is a dark color. As used herein, the term "dark color" refers to a background that has less than 20% of the reflectance of a foreground object (e.g., a foreign metallic particle) being measured.

Still referring to FIG. 1, the electrode production line 10 includes one or more foreign metallic particle detectors 180. For example, and for illustrative purposes only, a foreign metallic particle detector 180 can be positioned upstream of the first dryer 130, downstream of the first dryer 130, upstream of the second dryer 160, and/or downstream of the second dryer 160. In some variations, a foreign metallic particle detector 180 is moved from one position (e.g., upstream the first dryer 130 and/or the second dryer 160) to another position (e.g., downstream the first dryer 130 and/or the second dryer 160) in order to detect foreign metallic particles on or at least partially within the first active material layer 114 and/or the second active material layer 144 during manufacture of the electrode strip 200. Stated differently, a single foreign metallic particle detector 180 can be releasably attached (e.g, magnetically or mechanically attached to a structural component of the electrode production line 10) at different locations along the electrode production line 10 such that a source of foreign metallic particles can be determined without use or employment of a multi-detector setup or system.

During operation of the electrode production line 10, the first active material source 110 applies the first active material 112 to the first side 101 of the charge collector backing layer 102 to form one or more first active material layers 114 thereon and the one or more first active material layers 114 (i.e., the one or more first active material layers 114 on the charge collector backing layer 102) pass through the first dryer 130 such that solvent within the one or more first active material layers 114 is removed therefrom. It should be understood that the first dryer 130 can be a source or foreign metallic particles, and accordingly, in some variations a foreign metallic particle detector 180 scans the one or more active material layers 114 before entering the first dryer 130 and another foreign metallic particle detector 180 scans the one or more active material layers 114 after passing through the first dryer 130 such that foreign metallic particles can be detected upstream and downstream of the dryer 130 as described in greater detail below.

In variations where the electrode production line includes the second active material source 140, the second active material 142 is applied to the second side 103 of the charge collector backing layer 102 such that one or more second active material layers 144 are formed thereon. Also, the one or more second active material layers 144 pass through the second dryer 160 such that solvent within the one or more second active material layers 144 is removed therefrom. And similar to the first dryer 130, the second dryer 160 can be a source or foreign metallic particles, and accordingly, in some variations a foreign metallic particle detectors 180 scans the one or more active material layers 144 before entering the second dryer 160 and another foreign metallic particle detector 180 scans the one or more active material layers 144 after passing through the second dryer 160. And while FIG. 1 illustrates foreign metallic particle detectors 180 upstream and downstream of the first and second dryers 130, 160, it should be understood that one or more foreign metallic particle detectors 180 can be positioned upstream and/or downstream other components or stations along the electrode production line 10 including but not limited to coating components/stations, pressing components/stations, slitting components/stations, notching components/stations, stacking components/stations, welding components/stations, assembly components/stations, and sealing components/stations, among others.

Not being bound by theory, the presence of a foreign metallic particle on or partially within the one or more active material layers 114 and/or second active material layers 144 reflects more incident light than the surrounding active material 112, 142. For example, metallic particles with an average size or diameter greater than about 10 micrometers (μm) strongly reflect light under desired illumination conditions. Accordingly, the difference between the low reflection of light (e.g., less than 10%) by the active material 112, 142 and the high reflection of light (e.g., greater than 50%) by a metallic particle is imaged by a foreign metallic particle detector 180 such that the presence of a foreign metallic particle is detected.

As used herein, the term "light" refers to ultraviolet (UV) light, visible light, and/or infrared (IR) light. For example, in some variations, foreign metallic particles are detected via illumination of the first active material layer 114 and/or the second active material layer 144 with UV light, while in other variations foreign metallic particles are detected via illumination of the first active material layer 114 and/or the second active material layer 144 with visible light. In at least one variation, foreign metallic particles are detected via illumination of the first active material layer 114 and/or the second active material layer 144 with IR light. And in some variations, foreign metallic particles are detected via illumination of the first active material layer 114 and/or the second active material layer 144 with a combination of UV, visible and/or IR light.

Still referring to FIG. 1, in some variations, the one or more foreign metallic particle detectors 180 are in communication (e.g, wired and/or wireless communication) with a controller 190 such that a timestamp of a detected foreign metallic particle 'P' in combination with an encoder 192 in-situ identifies and stores a physical position (location) of the detected foreign metallic particle P on the electrode strip 200. And in such variations a section of the electrode strip 200 containing or having the foreign metallic particle P can be identified and removed before the section is placed within a battery cell or a fuel cell.

In some variations, one or more of the foreign metallic particle detectors 180 is a line scan camera 180. For example, a foreign metallic particle detector 180 can have a line scan sensor with between 512 to 12,000 (12 k) pixels (e.g., 512, 1 k, 2 k, 4 k, 8 k, 12 k, among others) that may or may not be read out on multiple channels (e.g., dual channels, quad channels, eight channels, among others). In addition, the pixels can have a size of about 5 μm×5 μm, 7 μm×7 μm, 10 μm×10 μm, 14 μm×14 μm, among others. The magnification of the line scan camera can be adjusted such that reflection from a foreign metallic particle P having an average diameter less than a predetermined size (e.g., ≤100 μm) is captured within a single pixel (e.g., a 20:1 magnification to image a 100 μm particle within a 5 μm×5 μm pixel). And in such variations, an image of the foreign metallic particle P contributes most if not all of the signal to a single pixel and thereby maximizes the relative contribution of the foreign metallic particle P and the substrate (i.e., surrounding active material layer 114) to an image of the foreign metallic particle P.

In other variations, one or more of the foreign metallic particle detectors 180 is an area scan camera 180. For example, the area scan camera 180 can be a sCMOS camera with a rolling shutter. In addition, the magnification of the sCMOS camera can be adjusted such that reflection from a foreign metallic particle P having an average diameter less than a predetermined size (e.g., ≤100 μm) is captured within a minimum of a single pixel (e.g., 3 to 5 pixels, in some variations) of the sCMOS camera (e.g., a 20:1 magnification to image a 100 μm particle within a 5 μm×5 μm pixel). And in such variations, an image of the foreign metallic particle P contributes most if not all of the signal to a single pixel and thereby maximizes the relative contribution of the foreign metallic particle P and the substrate (i.e., surrounding active material layer 114) to an image of the foreign metallic particle P.

Figure 2:
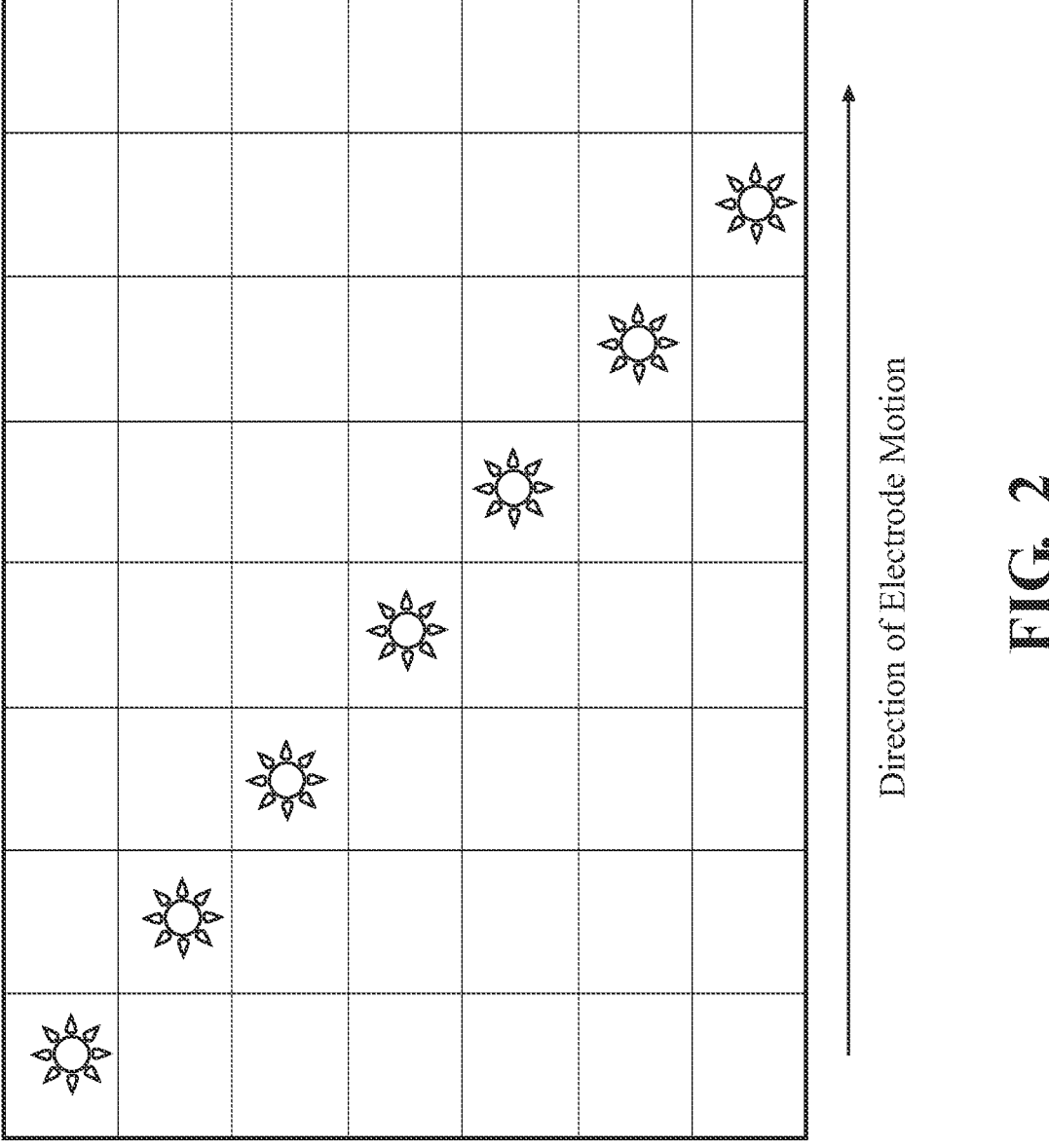
FIG. 2 is a kymograph showing time (direction of sequential row exposures) versus direction of an electrode strip motion for the exposure of a foreign metallic particle detected on an active material layer and as imaged with a sCMOS camera with a rolling shutter according to the teachings of the present disclosure.

The rolling shutter exposes each camera row in sequence such that a sequence of individual scans can be provided. In addition readout times as fast as 10 microseconds (usec) per row can be provided and such readout times allow for 'N' independent measurements of a single metal particle such that confidence of a single particle detection is enhanced. For example, and with reference to FIG. 2, a kymograph of a single metallic particle can be provided such that an image of the single metallic particle appears as a line, instead of a single point, when rows of the rolling shutter are assembled. Accordingly, use of such an area scan camera 180 provides enhanced detection of foreign metallic particles P with lower signal to noise ratios.

In some variations, the shutter time and magnification can be set or adjusted such that each exposure results in a particle moving about 1 one row (i.e., about 50 usec) and the benefits of maximal signal to noise ratio exposure is obtained. Also, about 1000 measurements per particle can be obtained. And assuming 1 watt of illumination on a 10 cm×10 cm patch of electrode, a single 100 μm particle induces about 200,000 photons per pixel in 50 μsec such that with an assumed 50% quantum efficiency, signals for detection of foreign metallic particles using the area scan camera 180 provide sufficient imaging thereof.

Figure 3:
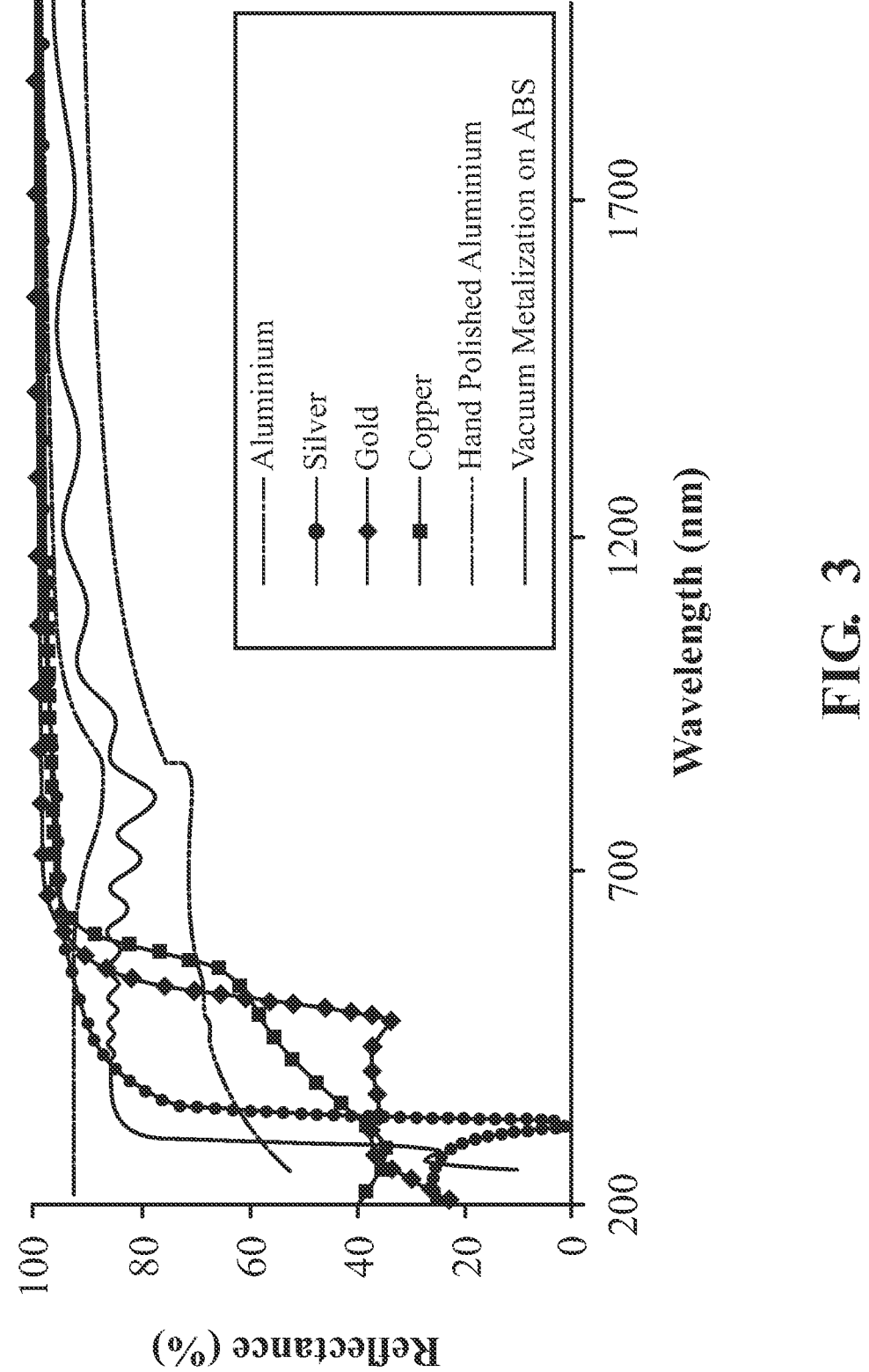
FIG. 3 is a plot of reflectance (%) versus light wavelength reflected from different metals.

Referring now to FIG. 3, in some variations the one or more foreign metallic particle detectors 180 and/or the controller 190 provide a chemical characterization of a foreign metallic particle. For example, metals such as aluminum, silver, gold, and copper, among others, exhibit a signature reflectance versus light wavelength profile. Accordingly, detecting and measuring the percentage (%) of light reflected from a metallic particle as a function of incident light wavelength is used to chemically characterize and detect foreign metallic particles. For example, and assuming an average 10% background noise from an active material layer, an aluminum particle would exhibit a signal to noise ratio between about 9.0 and about 9.5 for incident light having wavelengths between about 200 nm and about 500 nm, whereas a copper particle would exhibit a signal to noise ratio between about 3.0 and about 4.0 for incident light having wavelengths between about 200 nm and about 500 nm. Accordingly, the foreign metallic particle detector 180 and/or the controller 190 distinguishes between a foreign aluminum particle and a foreign copper particle (and other foreign metallic particles) using a lookup table of signal to noise ratios for different metallic particles. It should be understood that other techniques and components (e.g., dichroic filters) can be used to identify and chemically characterize foreign metallic particles according to the teachings of the present disclosure. For example, in some variations multi-band spectroscopy is used in which a dichroic filter splits light scattered from a foreign metallic particle into two or more channels, and a differential measurement of the light intensity in each channel to determine of a chemical characterization of a foreign metallic particle. In other variations, an optical spectrometer with a diffraction grating and a two-dimensional (2D) sensor are used to provide hyperspectral imaging to determine a chemical characterization of a foreign metallic particle. These variations are described in greater detail below in connection with FIGS. 10-12.

Figure 4A:
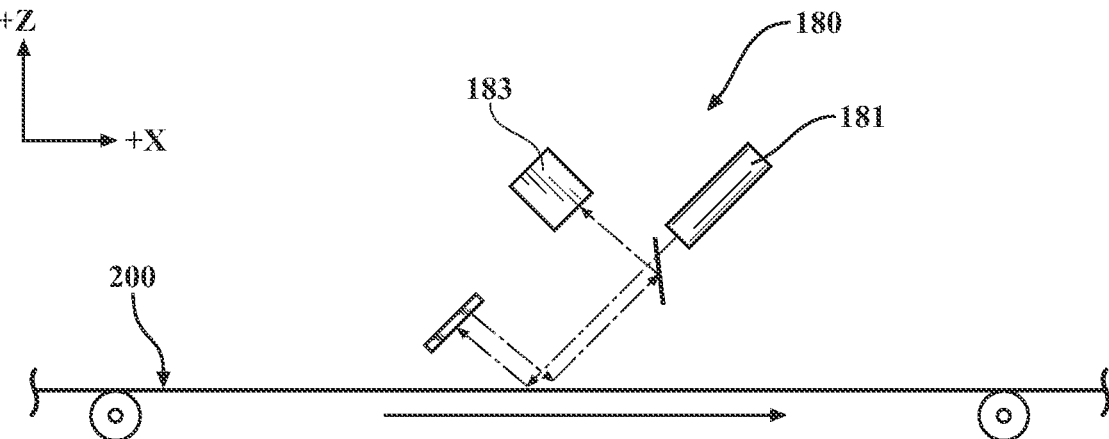
FIG. 4A illustrates a foreign metallic particle detector positioned and exposed to a surrounding environment according to the teachings of the present disclosure.
Figure 4B:
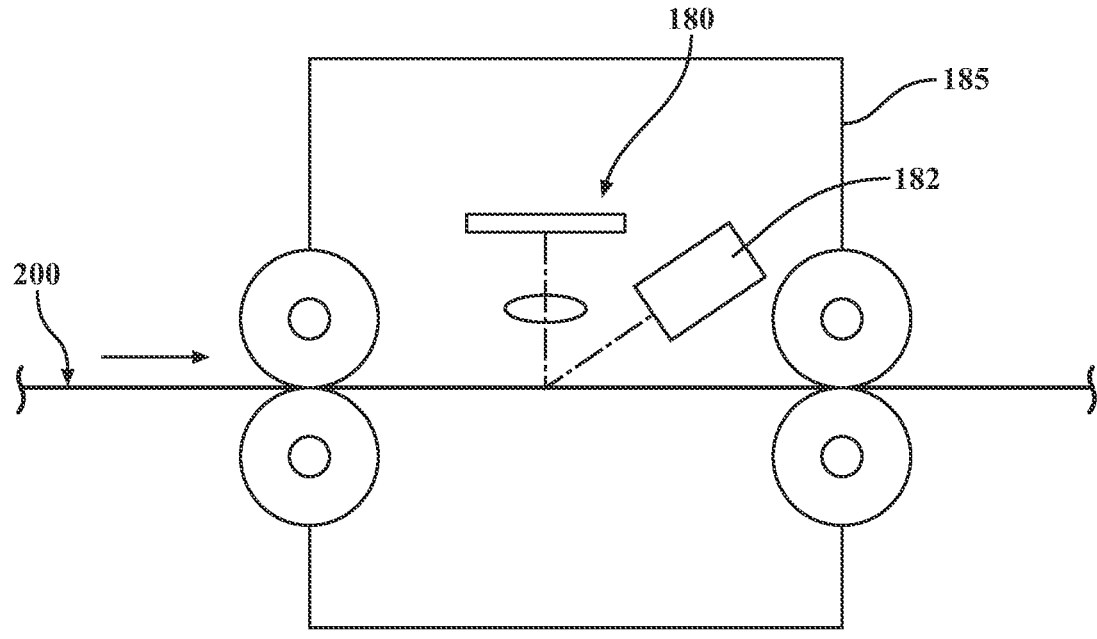
FIG. 4B illustrates a foreign metallic particle detector positioned within an enclosure according to the teachings of the present disclosure.

Referring to FIGS. 4A-4B, in some variations the one or more foreign metallic particle detectors 180 are exposed to a surrounding production line environment (i.e., not contained with an enclosure) as illustrated in FIG. 4A, while in other variations the one or more foreign metallic particle detectors 180 are positioned or contained with a light-tight enclosure 185 (also referred to herein simply as "enclosure") as illustrated in FIG. 4B. For example, and with reference to FIG. 4A, use of an UV or IR light source 181 for propagating UV or IR light onto the active material layer 114 results in ambient or factory light not being detected by or interfering with UV or IR light reflected from a foreign metallic particle and detected or imaged by a sensor 183. In some variations, the sensor 183 is a line scanner. In other variations, the sensor 183 is a 2D imaging sensor. Accordingly, protecting or shielding the foreign metallic particle detector 180 from "outside" light is not employed. In the alternative, the enclosure 185 (FIG. 4B) shields the one or more foreign metallic particle detectors 180 from ambient or factory light such that a UV or IR light is not required, a visible light source 182 (e.g., a broadband light source or a visible laser light source) can be used, and/or an increase in the signal to noise ratio of light reflected from foreign metallic particles illuminated within the enclosure 185 is provided. And while FIGS. 4A-4B show only one foreign metallic particle detector 180 exposed to a surrounding environment and only one foreign metallic particle detector 180 positioned within an enclosure, respectively, it should be understood that the electrode production line 10 can include one or more foreign metallic particle detectors 180 exposed to a surrounding environment (i.e., not within an enclosure) and one or more foreign metallic particle detectors 180 positioned or contained within the enclosure 185. In addition, in some variations one or more of the foreign metallic detectors 180 include more than one type of detector (e.g., a line scan camera and a multi-band spectroscopy system, a dark field camera/imager and a bright field camera/imager, among others) and/or more than one imaging modality (e.g., simultaneous bright field and dark field spectroscopy imaging).

Figures 5, 6A, 6B:
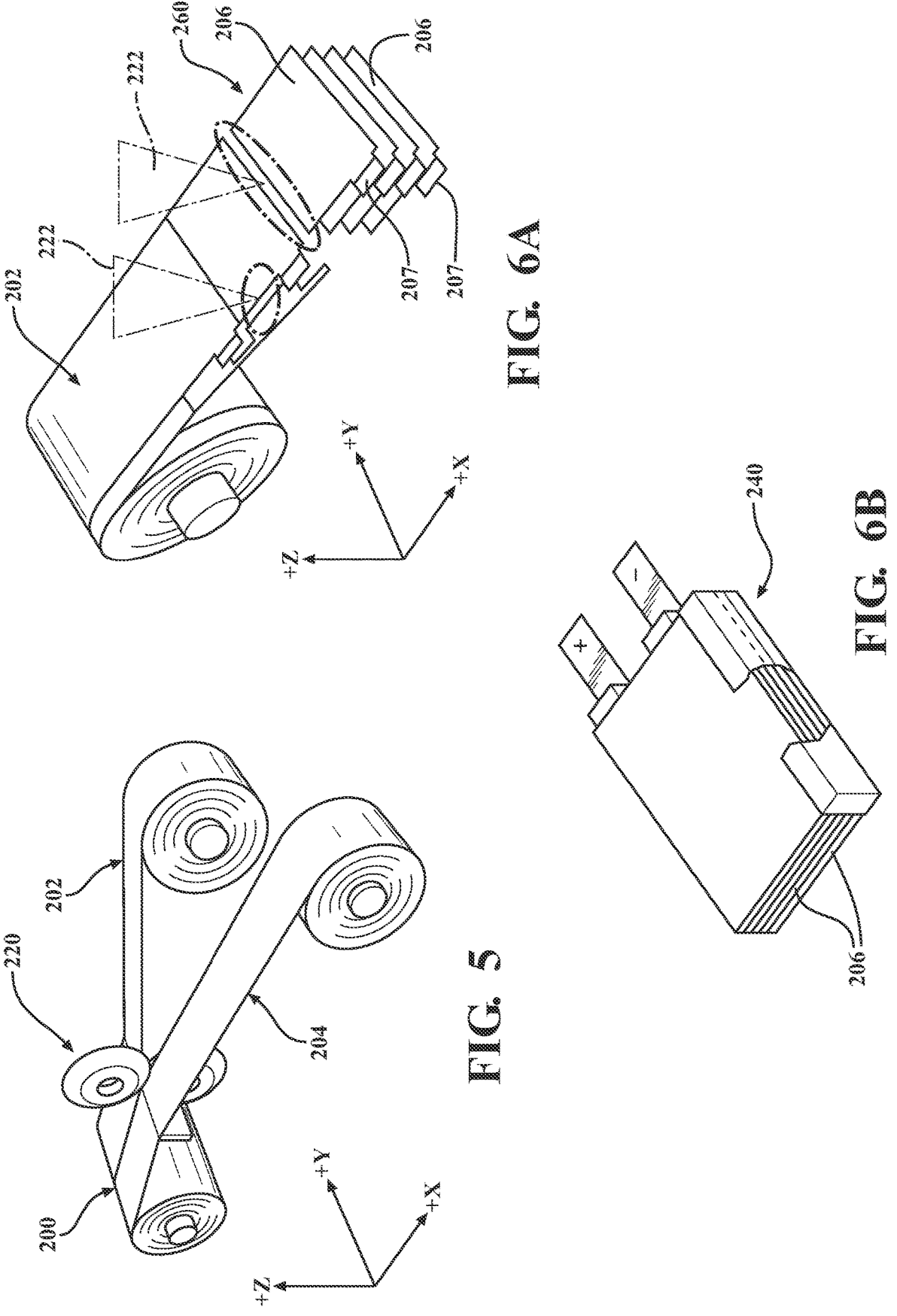
FIG. 5 illustrates a perspective view of a slitter station according to the teachings of the present disclosure.
FIG. 6A illustrates a perspective view of a cutting station and a stacking station according to the teachings of the present disclosure.
FIG. 6B illustrates a stacked battery cell according to the teachings of the present disclosure.

Referring now to FIG. 5, in some variations the electrode production line 10 includes a slitter 220 (e.g., a mechanical or laser slitter) that cuts the electrode strip 10 in a length direction such that at least two electrode strips 202, 204 are formed for further processing. Also, in at least one variation one or both of the electrode strips 202, 204 (referred to hereafter simply as "electrode strip 202") is cut into panels 206 with tabs 207 using one or more cutters 222 (e.g., a laser cutter) as illustrated in FIG. 6A and the panels 206 are assembled with separator layers (not shown) at a stacking station 260 to form battery cells 240 illustrated in FIG. 6B. It should be understood that the slitter 220 and/or the one or more cutters 222 can be a source of foreign metallic particles, and thus while not shown in FIGS. 5 and 6A, one or more foreign metallic particle detectors 180 can be positioned upstream and/or downstream of the slitter 220 and/or the one or more cutters 222.

Figures 7A, 7B:
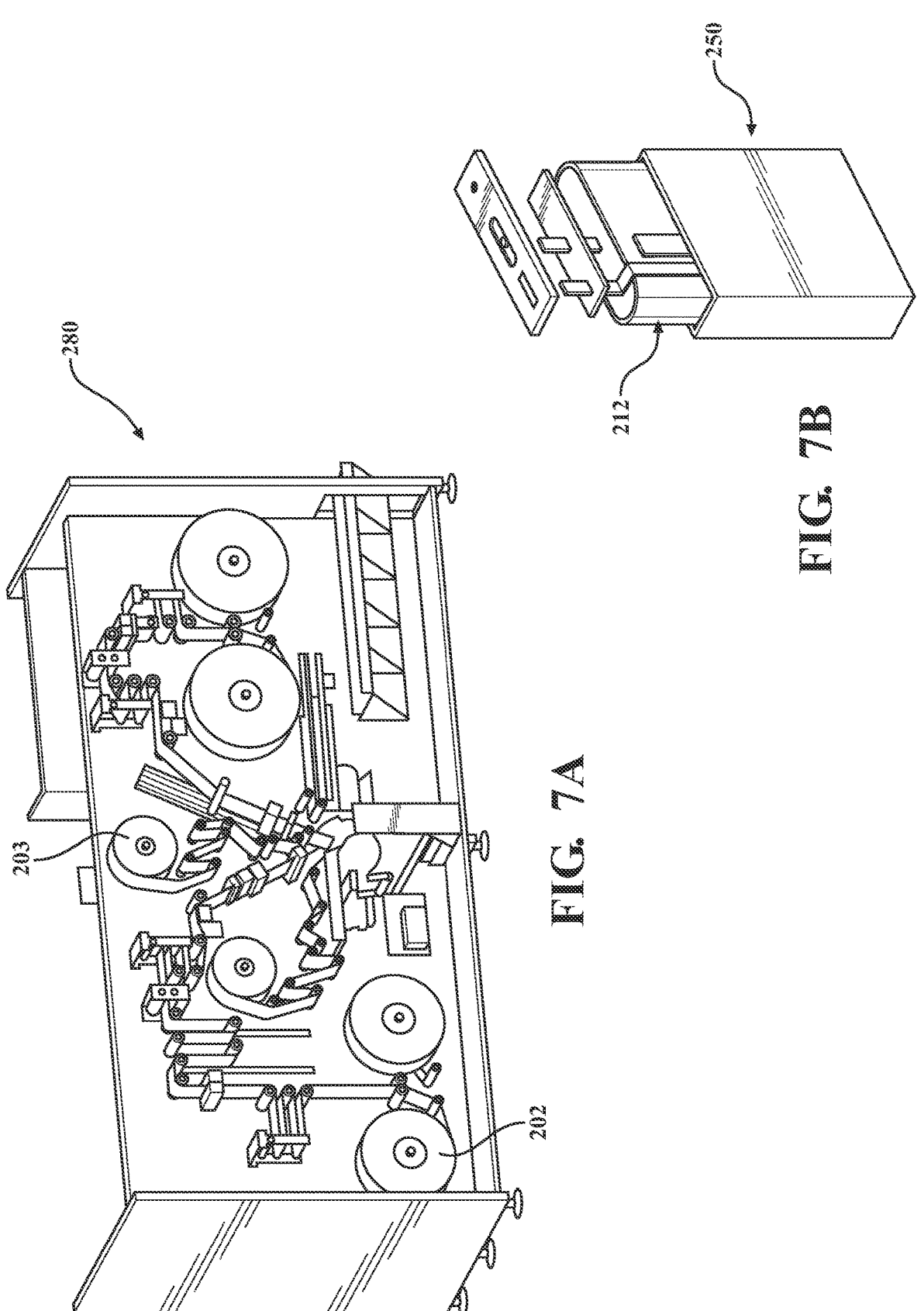
FIG. 7A illustrates an electrode winding machine for manufacture of a coiled electrode battery cell according to the teachings of the present disclosure.
FIG. 7B illustrates a coiled battery cell according to the teachings of the present disclosure.

Referring to FIGS. 7A-7B, in at least one variation an electrode winder 280 winds an electrode strip 202 (or 204) with a separator layer 203 to form coil electrode cells 212 (also known as "jelly rolls") for coil batteries 250. And while a foreign metallic particle detector 180 is not shown in FIG. 7A, it should be understood that one or more foreign metallic particle detectors 180 can be positioned along the processing route of the electrode strip 202 within the electrode winder 280 for detecting foreign metallic particles and a source of foreign metallic particles.

Figure 8:
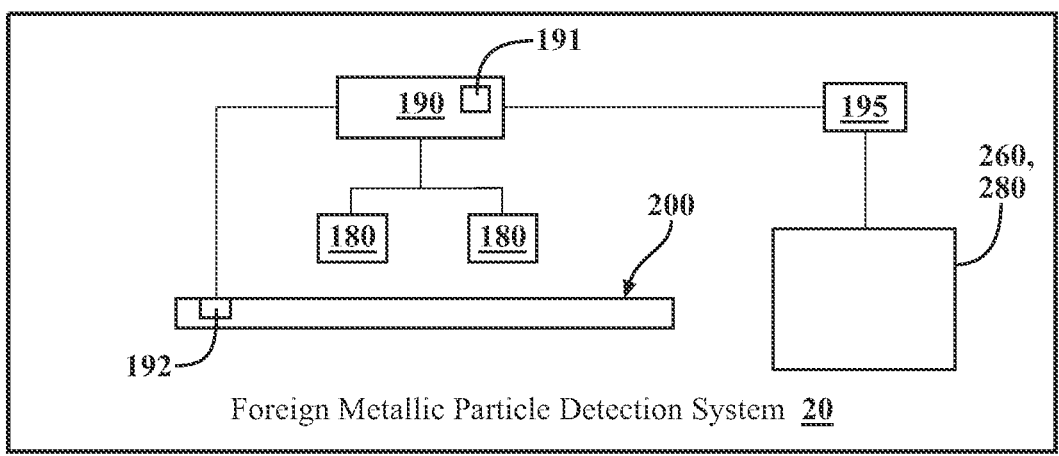
FIG. 8 is a block diagram of a foreign metallic particle detection system according to the teachings of the present disclosure.

Referring to FIG. 8, a block diagram of a foreign metallic particle detection system 20 is shown. In this variation, the foreign metallic particle detection system 20 includes one or more foreign metallic particle detectors 180 (two are shown in FIG. 8 for illustration purposes) and the encoder 192 in communication with the controller 190 such that the presence of one or more foreign metallic particles P can be detected and its position or location on the electrode strip 200 determined and stored in a memory 191. In some variations, the controller 190 is configured to receive signals provided from the detector(s) 180 and determine foreign metallic particles P with an average diameter greater than or equal to about 10 μm and less than or equal to 1500 μm, for example an average diameter between about 25 μm and 1000 μm, between about 25 μm and about 500 μm, or between about 25 μm and about 250 μm.

The foreign metallic particle detection system 20 can include the stacking station 260 and/or the electrode winder 280, and a programmable logic controller 195 in communication with the controller 190 can execute a command to remove one or more of the panels 206 or jelly rolls 208 that the controller 190 and/or the one or more foreign metallic particle detectors 180 has identified as containing one or more foreign metallic particles P. In the alternative, or in addition to that, the programmable logic controller 195 can communicate with the controller 190 and can execute a command to remove an electrode cell 210, 212 that has been identified as containing one or more foreign metallic particles.

Figure 9:
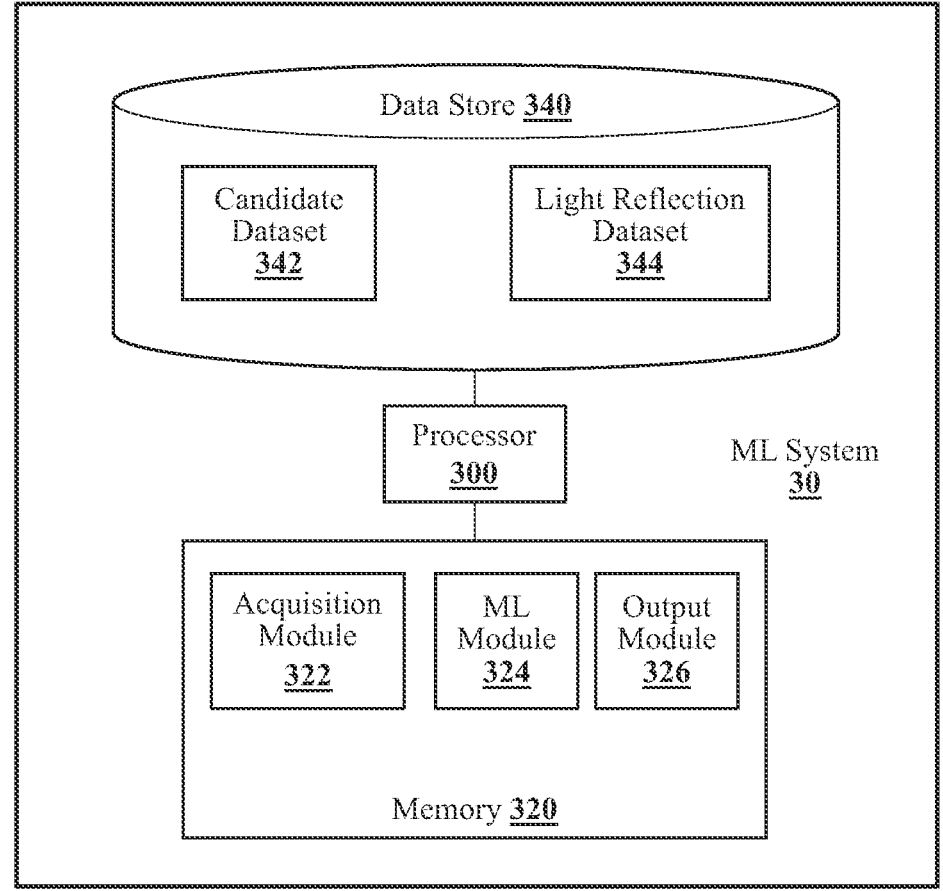
FIG. 9 is a block diagram that illustrates an example of a machine learning system for predicting the presence and/or composition of foreign metallic particles according to the teachings of the present disclosure.

Referring to FIG. 9, in some variations the controller 190, or another controller (not shown) in communication with the controller 190, includes a machine learning (ML) system 30 configured to learn and identify foreign metallic particles. The ML system 30 is shown including one or more processors 300 (referred to herein simply as "processor 300"), a memory 320 and a data store 340 communicably coupled to the processor 300. It should be understood that the processor 300 can be part of the ML system 30, or in the alternative, the ML system 30 can access the processor 100 through a data bus or another communication path.

The memory 320 is configured to store an acquisition module 322, a ML module 324, and in some variations, an output module 326. The memory 320 is a random-access memory (RAM), read-only memory (ROM), a hard-disk drive, a flash memory, or other suitable memory for storing the acquisition module 322, the ML module 324, and the output module 326. Also, the acquisition module 322, ML module 324 and output module 326 are, for example, computer-readable instructions that when executed by the processor 300 cause the processor(s) to perform the various functions disclosed herein.

In some variations the data store 340 is a database, e.g., an electronic data structure stored in the memory 320 or another data store. Also, in at least one variation the data store 340 in the form of a database is configured with routines that can be executed by the processor 300 for analyzing stored data, providing stored data, organizing stored data, and the like. Accordingly, in some variations the data store 340 stores data used by one or more of the acquisition module 322, ML module 324 and output module 326. For example, and as shown in FIG. 9, in at least one variation the data store 340 stores a candidate dataset 342 and a light reflection dataset 344. In some variations the candidate dataset 342 includes a listing of a plurality of metallic particles, including a listing of particle sizes and particle chemical compositions. Also, the light reflection dataset 344 includes percent light reflected as a function of light wavelength, and optionally as a function of particle size, for one or more of the plurality of metallic particles listed in the candidate dataset 342. And in at least one variation, the candidate dataset 342 includes a training dataset with one or more metallic particles tagged with one or more percent light reflected as a function of light wavelength.

The acquisition module 322 can include instructions that function to control the processor 300 to select a metallic particle from the candidate dataset 342 and a corresponding percent reflected light as a function of light wavelength from the light reflection dataset 344. And in at least one variation the acquisition module 322 can include instructions that function to control the processor 300 to provide the selected metallic particle and the corresponding percent reflect light as a function of light wavelength as an input dataset to the ML module 324.

The ML module 324 includes instructions that function to control the processor 300 to train a ML model (algorithm) using the input dataset. In some variations, the ML module 324 includes instructions that function to control the processor 100 to train the ML model unsupervised. In other variations, the ML module 324 includes instructions that function to control the processor 300 to train the ML model supervised using a training dataset with one or more metallic particles with one or more percent reflected light as a function of wavelength. Stated differently, in some variations the input dataset can include one or metallic particles tagged with one or more percent reflected light as a function of light wavelength (e.g., a training dataset) and the ML module 324 trains the ML model to predict the tagged percent reflected light as a function of light wavelength for the one or more metallic particles to within a desired value (i.e., less than or equal to a desired value) of a cost function (also known as a "loss function"). In other variations, the input dataset can include images of foreign metallic particles with or without data on overall light intensity, shape, and position of electrode, among others, and the ML module 324 trains the ML model to predict if a foreign metallic particle is present based on a captured image. And after training of the ML model, the ML module 324 includes instructions that function to control the processor 300 to predict metallic particles, both size and chemical composition, for metallic particles not tagged with the percent reflected light as a function of light wavelength (i.e., not in the training dataset).

Non-limiting examples of the ML model include ML models such as nearest neighbor models, Naïve Bayes models, linear regression models, support vector machine (SVM) models, and neural network models, among others. And in at least one variation the ML model is a Gaussian Process regression model. Also, training of the ML model provides a model that predicts an optimized material composition with respect to a predefined material property to within a desired value (i.e., less than or equal to a desired value) of a cost function (also known as a loss function).

In operation, the ML system 30 learns the percentage of light reflected from foreign metallic particles having different sizes and/or chemical compositions. In some variations, the ML system 30 learns the percentage of light reflected, overall light intensity, shape, and/or among other characteristics from foreign metallic particles having different sizes and/or chemical compositions of foreign metallic particles as a function of light wavelength, multi-channel light intensity differential measurements, and/or hyperspectral imaging. Such variations are discussed in greater detail below in connection with FIGS. 10-12. In addition, the ML system 30 receives signals from the one or more foreign metallic particle detectors 180 and identifies foreign metallic particles, foreign metallic particles sizes, and/or foreign metallic particle chemical composition based on the received signals.

Figure 10:
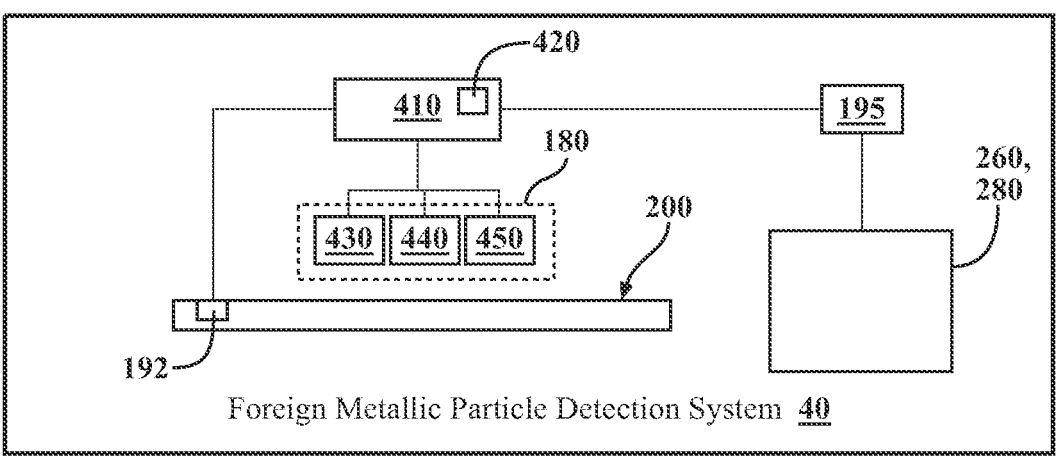
FIG. 10 is a block diagram of a variation of the foreign metallic particle detection system shown in FIG. 8 according to the teachings of the present disclosure.

FIG. 10 is a block diagram of a foreign metallic particle detection system 40, a variation of the foreign metallic particle detection system 20 discussed above in connection with FIG. 8, according to the teachings of the present disclosure. As mentioned above, the variation in FIG. 10 uses optical spectroscopy to differentiate among different types of metal particulate (foreign metallic particles) after a foreign metallic particle has been detected. More specifically, an optical spectrometer with a spectroscopic optical element (e.g., a diffraction grating or a photonic crystal mask) is used to generate a reflectance spectrum of the detected foreign metallic particle, the analysis of which provides a chemical characterization of the detected foreign metallic particle.

In the variation diagrammed in FIG. 10, detector 180 includes a sensor 430 and a sensor 440. Sensor 430 is used in connection with detecting the presence of foreign metallic particles in or on an active material layer (114/144) of an electrode strip 200, as described above. Sensor 430 outputs image data based on light from a light source (not shown in FIG. 10) that is reflected from the active material layer (114/144). In one variation, sensor 430 is a line scanner (or line sensor). In a different variation, sensor 430 is a sCMOS camera with a rolling shutter, as described above. In some variations, the associated light source is a monochromatic light source (e.g., UV or IR light), as also discussed above. In the variation of FIG. 10, foreign metallic particles are detected using the techniques described above, which can, in some variations, include the use of ML system 30 to analyze the image data from sensor 430.

As discussed above, foreign metallic particle detection system 40 can, via the image data from sensor 430, determine the position of the foreign metallic particle on the moving electrode strip 200. The position, once determined, can be saved in memory 420.

Sensor 440 generates a reflectance spectrum of a detected foreign metallic particle to support chemical characterization of the detected foreign metallic particle. In other words, analysis of the reflectance spectrum enables foreign metallic particle detection system 40 to identify the type of metal (e.g., aluminum, copper, silver, gold, or stainless steel) of which the detected foreign metallic particle is composed.

In some variations, sensor 440 is a hyperspectral imager that detects light from a broadband light source that is reflected from the active material layer (114/144) and that, before reaching sensor 440, passes through a spectroscopic optical element. The spectroscopic optical element operates upon the reflected broadband light in a wavelength-dependent manner. In one variation, the spectroscopic optical element is a diffraction grating. In a different variation, the spectroscopic optical element is a photonic crystal mask. As those skilled in the art are aware, a hyperspectral imager produces images that, along one axis, represent spatial information and that, along an orthogonal axis, represent spectral (frequency) information. Thus, a hyperspectral image contains, for each of a plurality of spatial pixels along the spatial axis, a corresponding reflectance spectrum (a plurality of pixels along the spectral axis). Since one or more pixels in the hyperspectral image encompass a detected foreign metallic particle, the hyperspectral image includes a reflectance spectrum of the detected foreign metallic particle. As discussed above in connection with FIG. 3, different kinds of metal exhibit different reflectance profiles as a function of wavelength. Therefore, the reflectance spectrum enables foreign metallic particle detection system 40 to identify of what type of metal a detected foreign metallic particle is composed. As discussed further below, in some variations, ML system 30 analyzes the reflectance spectrum of the detected foreign metallic particle to perform this identification.

It should be noted that foreign metallic particle detection system 40, specifically controller 410 (implemented, e.g., as one or more processors), triggers sensor 440 only when a foreign metallic particle has been detected. Thus, sensor 440 is positioned somewhat downstream from sensor 430 along the electrode strip 200. Since the position of the detected foreign metallic particle is known from the image data produced by sensor 430 and the speed at which the electrode strip 200 is moving is also known, controller 410 can calculate the precise time at which the detected foreign metallic particle will be aligned with the field of view of sensor 440. At that time, controller 410 causes sensor 440 to capture a hyperspectral image that encompasses the detected foreign metallic particle. The physical distance between sensor 430 and sensor 440 can differ, depending on the particular variation. In some variations, the two sensors are placed in relatively close proximity to each other, but they are aimed at different angles with respect to the electrode strip 200 to achieve the effect of a greater spatial separation.

In the variation of FIG. 10, memory 420, compared with memory 191 in the variation diagrammed in FIG. 8, includes additional machine-readable instructions that, when executed by controller 410, perform the various functions described herein that are associated with triggering and otherwise controlling the operation of sensor 440.

In some variations, detector 180 includes a third sensor, reference sensor 450. Reference sensor 450 improves the accuracy of absolute reflectance measurements made by sensor 440 by accounting for fluctuations in the light source associated with sensor 440. Measurements of absolute reflectance can aid foreign metallic particle detection system 40 in distinguishing among the various types of foreign metallic particles. For example, stainless steel and aluminum have similar reflectance spectra, but aluminum, being less shiny than stainless steel, has a lower absolute reflectance. Therefore, they can be distinguished based on their respective absolute reflectance. To make measurements of absolute reflectance, a reference is needed, which reference sensor 450 provides.

In some variations, foreign metallic particle detection system 40 includes a plurality of detectors 180 like that depicted in FIG. 10 along the plate electrode production line 10, each detector 180 having two or three sensors (sensor 430, sensor 440, and, optionally, reference sensor 450), depending on the particular variation, as described above.

Figure 11:
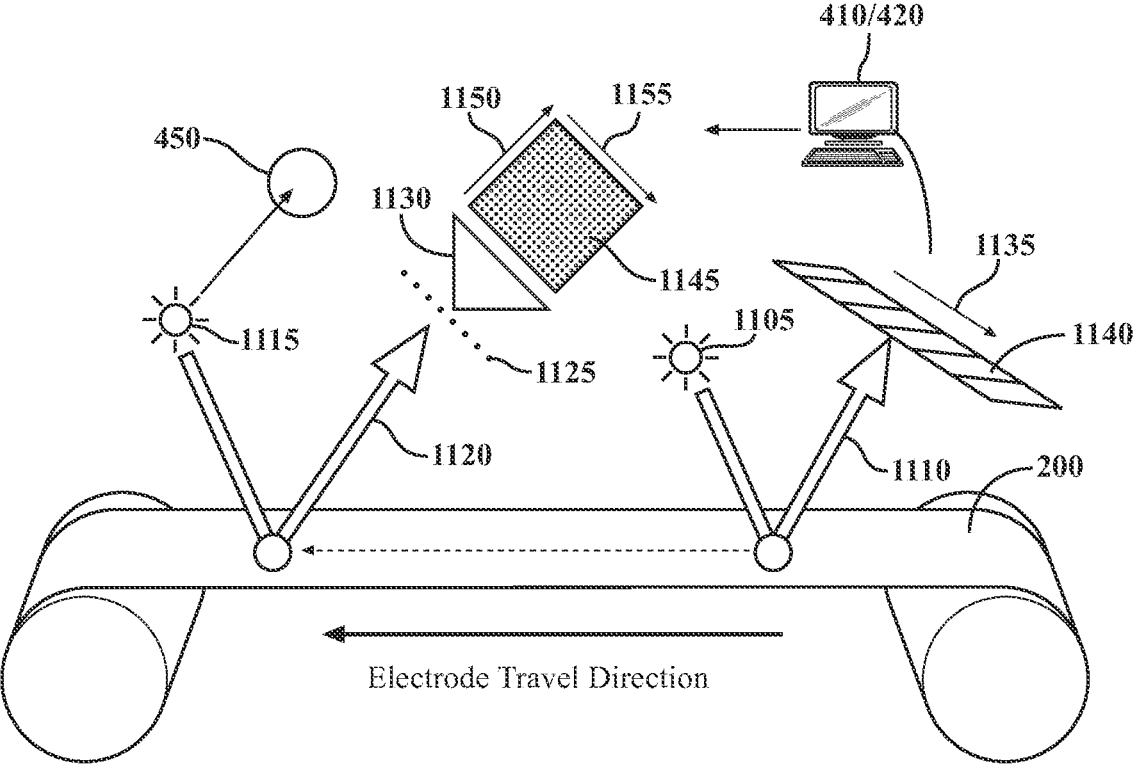
FIG. 11 illustrates aspects of the foreign metallic particle detection system shown in FIG. 10 according to the teachings of the present disclosure.

FIG. 11 illustrates aspects of the foreign metallic particle detection system 40 shown in FIG. 10, according to the teachings of the present disclosure. As shown in FIG. 11, reflected light 1110 from a light source 1105 is detected by sensor 430 (not shown in FIG. 11) to produce image data

1140 along a spatial axis 1135. Detection and triggering elements 410/420 (in some variations also including ML system 30) detect a foreign metallic particle on an active material layer (114/144) of the electrode strip 200 and, in response, trigger the downstream sensor 440 (not shown in FIG. 11).

Reflected light 1120 from a light source 1115 passes through a spectroscopic optical element 1125 that operates in a wavelength-dependent manner upon the reflected light 1120 to produce a spectroscopic output 1130. In a variation in which the spectroscopic optical element is a diffraction grating, for example, spectroscopic output 1130 includes the constituent spectral (frequency) bands of the reflected light 1120. Sensor 440 (in some variations, a hyperspectral imager), generates a 2D hyperspectral image 1145 that includes a reflectance spectrum of the detected foreign metallic particle. As discussed above, hyperspectral image 1145 represents spatial information along spatial axis 1150 (perpendicular to the direction of electrode movement) and spectral information along spectral axis 1155 (parallel to the direction of electrode movement). Thus, sensor 440 acts as a line scanner along the perpendicular (spatial) axis, imaging foreign metallic particles as they pass by sensor 440, and each pixel has its own corresponding frequency spectrum along the parallel (spectral) axis.

As discussed above, foreign metallic particle detection system 40 analyzes the reflectance spectrum of a detected foreign metallic particle from sensor 440 to identify the type of metal (e.g., copper, aluminum, gold, silver, or stainless steel) of which the foreign metallic particle is composed. In some variations, ML module 324 of ML system 30 (refer to FIG. 9) includes machine-readable instructions that, when executed by processor 300, cause the processor 300 to apply a ML model to the analysis of the reflectance spectrum. For example, a ML model can be trained to distinguish the different types of foreign metallic particles from one another through an iterative process in which hyperspectral-image training data is input to the ML model, coupled with supervision (e.g., annotation of the training data to provide a ground-truth reference) and calculation of a suitable cost/loss function. Alternatively, through techniques such as clustering, unsupervised training of the ML model can be performed, in some variations. As those skilled in the art will recognize, the training process can differ depending on whether the spectroscopic optical element 1125 is a diffraction grating or a photonic crystal mask because the hyperspectral data input to the ML model is different for the two different kinds of spectroscopic optical elements 1125. As those skilled in the art are also aware, the ML model in ML module 324 can be trained to output statistical (probabilistic) estimates of the type of metal.

In other variations, foreign metallic particle detection system 40 performs deterministic (e.g., rule-based) analysis of the hyperspectral images 1145 to identify the type of metal of which a detected foreign metallic particle is composed. In these variations, machine-readable instructions to carry out the deterministic analysis can be stored in memory 420 and executed by controller 410.

The variation illustrated in FIG. 11 includes a reference sensor 450 to improve measurements of absolute reflectance made by sensor 440, as discussed above. For example, reference sensor 450 can correct for fluctuations/variability in light source 1115.

A significant advantage of the variation discussed above in connection with FIGS. 10 and 11 is that, once foreign metallic particle detection system 40 has identified the type of metal of which a particular detected foreign metallic particle is composed and has determined its associated size and morphology data, the system can automatically determine the likely origin (source), in the electrode production line 10, of that detected foreign metallic particle. In one variation, foreign metallic particle detection system 40 stores, in a database, the locations, in the electrode production line 10, where various metals are used. If a particular detected foreign metallic particle is identified as an aluminum particle of a particular size and morphology, for example, foreign metallic particle detection system 40 can look up the location(s) in electrode production line 10 where such a detected foreign metallic particle is likely to have originated. This information permits faults in the electrode production line 10 to be corrected to minimize further defects.

The techniques discussed above involving the automatic removal, under the control of controller 410 and programmable logic controller 195, of sections/segments of the electrode strip 200 that contain detected foreign metallic particles can also be deployed in the variations discussed above in connection with FIGS. 10 and 11.

As with the other variations discussed above, the variations discussed above in connection with FIGS. 10 and 11 apply to both battery plate electrodes and fuel cell plate electrodes.

Figure 12:
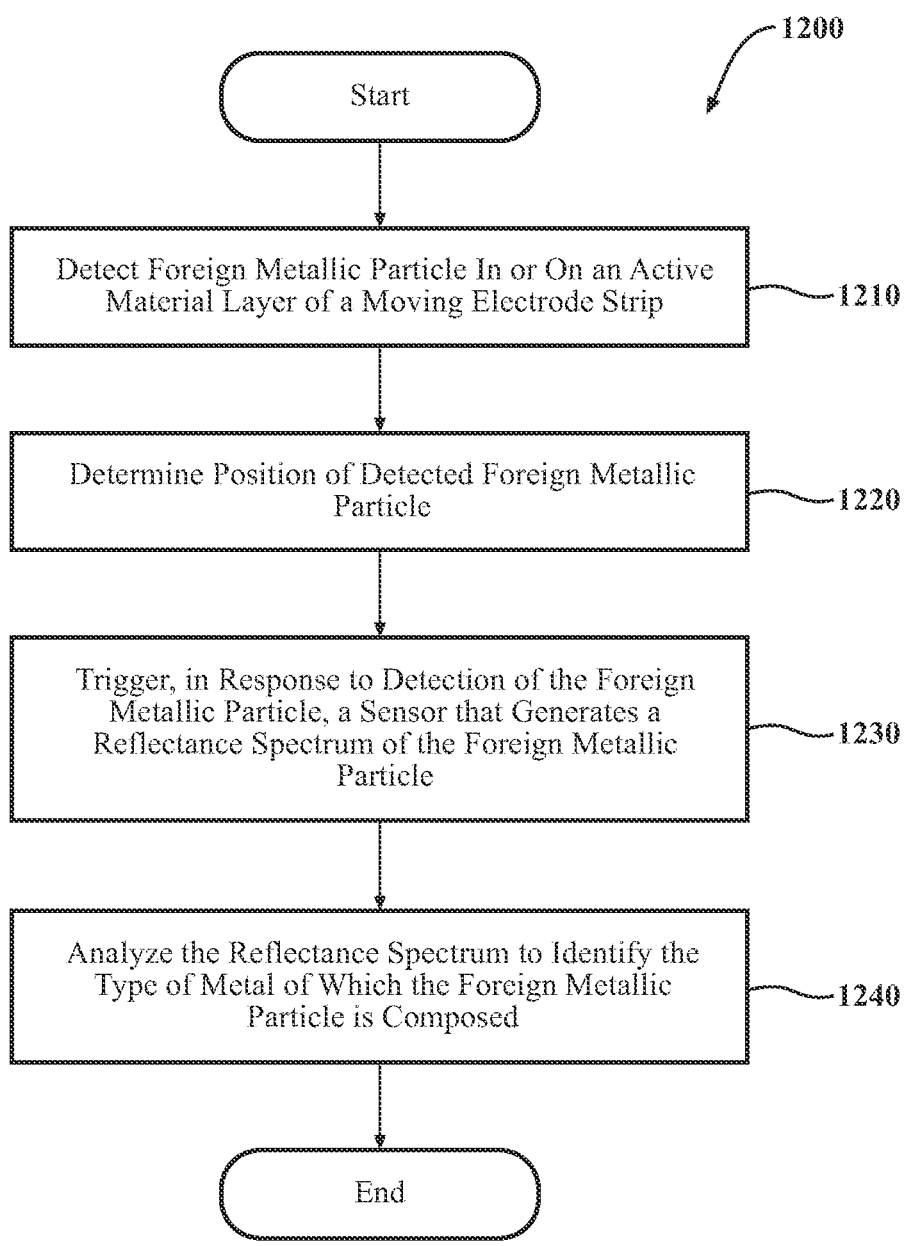
FIG. 12 is a flowchart of a method of detecting foreign metallic particles according to the teachings of the present disclosure.

FIG. 12 is a flowchart of a method 1200 of detecting foreign metallic particles according to the teachings of the present disclosure. Method 1200 will be discussed from the perspective of the foreign metallic particle detection system 40 in FIG. 10 with reference, also, to FIG. 11. While method 1200 is discussed in combination with foreign metallic particle detection system 40, it should be appreciated that method 1200 is not limited to being implemented within foreign metallic particle detection system 40, but foreign metallic particle detection system 40 is instead one example of a system that may implement method 1200.

At block 1210, foreign metallic particle detection system 40 detects automatically, through analysis of image data 1140 from sensor 430, a foreign metallic particle in or on an active material layer (114/144) of an electrode strip 200 moving between a section and a subsequent section on a roll-to-roll coated electrode manufacturing line 10 that manufactures a plate electrode. As discussed above, sensor 430 outputs image data 1140 based on light (1110) from a light source 1105 that is reflected from the active material layer (114/144). In one variation, sensor 430 is a line scanner. In another variation, sensor 430 is a sCMOS camera with a rolling shutter. In some variations, the associated light source 1105 is a monochromatic light source (e.g., UV or IR light), as discussed above. The foreign metallic particle is detected using the techniques described above, which, in some variations, include the use of ML system 30 to analyze the image data 1140 from sensor 430.

At block 1220, foreign metallic particle detection system 40 determines the position of the detected foreign metallic particle on the electrode strip 200 moving on the roll-to-roll coated electrode manufacturing line 10 and saves the position in memory 420. This is described in greater detail above in connection with FIGS. 8 and 9.

At block 1230, controller 410 of foreign metallic particle detection system 40 triggers, in response to detection of the foreign metallic particle and based on the position of the foreign metallic particle and the speed at which the electrode strip 200 is moving, the sensor 440, the sensor 440 generating a reflectance spectrum of the detected foreign metallic particle. As discussed above, in some variations, sensor 440 is a hyperspectral imager that detects light from a broadband light source that is reflected from the active material layer (114/144) and that, before reaching sensor 440, passes through a spectroscopic optical element 1125. The spectroscopic optical element 1125 operates, in a wavelength-dependent manner, upon the reflected broadband light 1120. In one variation, the spectroscopic optical element 1125 is a diffraction grating that separates the reflected broadband light into its constituent spectral (frequency) bands (spectroscopic output 1130). In another variation the spectroscopic optical element 1125 is a photonic crystal mask that produces a complex wavelength-dependent spectroscopic output 1130.

At block 1240, foreign metallic particle detection system 40 analyzes the reflectance spectrum to identify the type of metal (e.g., copper, aluminum, gold, silver, or stainless steel) of which the detected foreign metallic particle is composed. As discussed above in connection with FIG. 3, different kinds of metal exhibit different reflectance profiles as a function of wavelength. Therefore, the reflectance spectrum enables foreign metallic particle detection system 40 to identify of what type of metal a detected foreign metallic particle is composed. As discussed above, in some variations, ML system 30 analyzes the reflectance spectrum of the detected foreign metallic particle to perform the identification. In other variations, deterministic (e.g., rule-based) techniques can be used to analyze the hyperspectral images 1145 containing the reflectance spectra.

In some variations, method 1200 includes additional actions that are not shown in FIG. 12. For example, in some variations of method 1200, once foreign metallic particle detection system 40 has identified the type of metal of which a detected foreign metallic particle is composed and has determined its associated size and morphology data, the system can automatically determine the likely origin, in the electrode production line 10, of the detected foreign metallic particle. In one variation, foreign metallic particle detection system 40 stores, in a database, the locations, in the electrode production line 10, where various metals are used. If a particular detected foreign metallic particle is identified as an aluminum particle of a particular size and morphology, for example, foreign metallic particle detection system 40 can look up the location(s) in electrode production line 10 where such a foreign metallic particle is likely to have originated. This information permits faults in the electrode production line 10 to be corrected to minimize further defects.

In some variations, the techniques discussed above involving the automatic removal, under the control of controller 410 (the counterpart of controller 190 in FIG. 8) and programmable logic controller 195, of sections/segments of the electrode strip 200 that contain detected foreign metallic particles can also be deployed in the variations discussed above in connection with FIGS. 10 and 11 and the associated method 1200.

Some variations of method 1200 include using a reference sensor 450 to improve the accuracy of absolute reflectance measurements made by sensor 440 by accounting for fluctuations in the light source 1115 associated with sensor 440.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, "modules," as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A system for detecting foreign metallic particles, the system comprising:
   a first sensor and a second sensor;
   a processor; and
   a memory storing machine-readable instructions that, when executed by the processor, cause the processor to:
      detect automatically, through analysis of image data from the first sensor, a foreign metallic particle in or on an active material layer of an electrode strip moving between a section and a subsequent section on a roll-to-roll coated electrode manufacturing line that manufactures a plate electrode;
      determine a position of the foreign metallic particle on the electrode strip moving on the roll-to-roll coated electrode manufacturing line;
      trigger, in response to detection of the foreign metallic particle and based on the position of the foreign metallic particle and a speed at which the electrode strip is moving, the second sensor, the second sensor generating a reflectance spectrum of the foreign metallic particle;
      analyze the reflectance spectrum to identify a type of metal of which the foreign metallic particle is composed; and
      determine automatically, based on the type of metal and associated size and morphology data, an origin, in the roll-to-roll coated electrode manufacturing line, of the detected foreign metallic particle.

2. The system of claim 1, wherein the first sensor is one of a line scanner and a sCMOS camera with a rolling shutter.

3. The system of claim 1, wherein the first sensor detects light from a monochromatic light source that is reflected from the active material layer.

4. The system of claim 1, wherein the second sensor is a hyperspectral imager, the hyperspectral imager detecting light from a broadband light source that is reflected from the active material layer and that passes through a spectroscopic optical element, the spectroscopic optical element operating in a wavelength-dependent manner upon the light from the broadband light source that is reflected from the active material layer.

5. The system of claim 4, wherein the spectroscopic optical element is one of a diffraction grating and a photonic crystal mask.

6. The system of claim 1, wherein the machine-readable instructions to at least one of analyze the image data from the first sensor and analyze the reflectance spectrum from the second sensor include instructions that, when executed by the processor, cause the processor to apply a machine-learning model.

7. The system of claim 1, wherein the type of metal is one of copper, aluminum, gold, silver, and stainless steel.

8. The system of claim 1, wherein the plate electrode is one of a battery plate electrode and a fuel cell plate electrode.

9. The system of claim 1, wherein the machine-readable instructions include further instructions that, when executed by the processor, cause the processor to remove automatically, from the roll-to-roll coated electrode manufacturing line, a segment of the electrode strip that contains the detected foreign metallic particle.

10. The system of claim 1, further comprising a reference sensor that improves accuracy of absolute reflectance measurements by accounting for fluctuations in a light source associated with the second sensor.

11. A non-transitory computer-readable medium for detecting foreign metallic particles and storing instructions that, when executed by a processor, cause the processor to:

detect automatically, through analysis of image data from a first sensor, a foreign metallic particle in or on an active material layer of an electrode strip moving between a section and a subsequent section on a roll-to-roll coated electrode manufacturing line that manufactures a plate electrode;

determine a position of the foreign metallic particle on the electrode strip moving on the roll-to-roll coated electrode manufacturing line;

trigger, in response to detection of the foreign metallic particle and based on the position of the foreign metallic particle and a speed at which the electrode strip is moving, a second sensor that generates a reflectance spectrum of the foreign metallic particle;

analyze the reflectance spectrum to identify a type of metal of which the foreign metallic particle is composed; and determine automatically, based on the type of metal and associated size and morphology data, an origin, in the roll-to-roll coated electrode manufacturing line, of the detected foreign metallic particle.

12. The non-transitory computer-readable medium of claim 11, wherein the instructions include further instructions that, when executed by the processor, cause the processor to remove automatically, from the roll-to-roll coated electrode manufacturing line, a segment of the electrode strip that contains the detected foreign metallic particle.

13. The non-transitory computer-readable medium of claim 11, wherein the instructions to at least one of analyze the image data from the first sensor and analyze the reflectance spectrum from the second sensor include instructions that, when executed by the processor, cause the processor to apply a machine-learning model.

14. A method, comprising:

detecting automatically, through analysis of image data from a first sensor, a foreign metallic particle in or on an active material layer of an electrode strip moving between a section and a subsequent section on a roll-to-roll coated electrode manufacturing line that manufactures a plate electrode;

determining a position of the foreign metallic particle on the electrode strip moving on the roll-to-roll coated electrode manufacturing line;

triggering, in response to detection of the foreign metallic particle and based on the position of the foreign metallic particle and a speed at which the electrode strip is moving, a second sensor that generates a reflectance spectrum of the foreign metallic particle;

analyzing the reflectance spectrum to identify a type of metal of which the foreign metallic particle is composed; and determining automatically, based on the type of metal and associated size and morphology data, an origin, in the roll-to-roll coated electrode manufacturing line, of the detected foreign metallic particle.

15. The method of claim 14, wherein at least one of analyzing the image data from the first sensor and analyzing the reflectance spectrum from the second sensor is performed using a machine-learning model.

16. The method of claim 14, further comprising removing automatically, from the roll-to-roll coated electrode manufacturing line, a segment of the electrode strip that contains the detected foreign metallic particle.

17. The method of claim 14, further comprising using a reference sensor to improve accuracy of absolute reflectance measurements by accounting for fluctuations in a light source associated with the second sensor.

* * * * *